June 2, 1964   L. SMITH   3,135,900
POSITIONING SERVO FOR NAVIGATIONAL COMPUTER
Filed May 9, 1961   3 Sheets-Sheet 1

June 2, 1964     L. SMITH     3,135,900
POSITIONING SERVO FOR NAVIGATIONAL COMPUTER
Filed May 9, 1961     3 Sheets-Sheet 2

United States Patent Office 3,135,900
Patented June 2, 1964

3,135,900
POSITIONING SERVO FOR NAVIGATIONAL COMPUTER
Leo Smith, Nelson, British Columbia, Canada
(387 Alexis Nihon, St. Laurent, Quebec, Canada)
Filed May 9, 1961, Ser. No. 108,923
3 Claims. (Cl. 318—28)

The invention relates to a positioning servo which performs the initial operation in a navigational computer for omni-directional range systems (VOR) and the directional aids to air borne craft which employ a reference and variable phase voltage for computing direction and determining course.

The present widely used navigational system for air borne craft which is the most flexible, accurate and simple is described in the August 1960, issue of the publication entitled Electronics World. The system to be described eliminates considerable of the equipment shown in the said widely used system and obtains a more direct reading.

The main object is to provide a positioning servo for a navigational computer which is extremely accurate, extremely simple and reliable.

Another object is to provide a positioning servo for a navigational computer which costs less and is much smaller than the present equipment.

Another object is to provide a positioning servo for a navigational computer which automatically indicates the number of degrees the aircraft is off course instead of having a Left-Right and a To-From meter to indicate direction. The single instrument does complete computation, and no interpretation is required.

The above objects are accomplished by providing a positioning servo for a navigational computer comprising an iron core having coils mounted thereon for receiving reference and variable phase voltages, and amplifiers for providing constant impedances for reference and variable phase voltages and a constant output voltage across the varying impedance of the coils. The amplifier can be made of tubes or transistors by design. When an error signal is obtained it is amplified and connected to the rotor of an A.-C. motor designed to run at the frequency of the reference voltage. The A.-C. motor is connected to a phase shifter by a gear train and will rotate the phase until a null is obtained.

The invention consists in the novel arrangements, construction and combination of parts herein after described and shown in the drawings.

Figure 1:
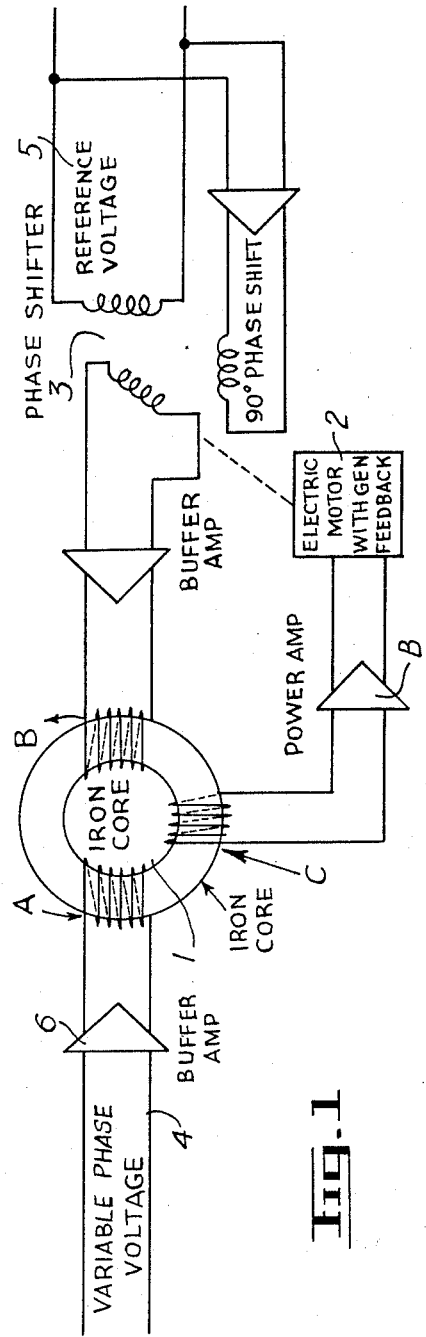
FIGURE 1 is a schematic drawing of a positioning servo.

The physical principle involved in this device, referring to FIGURE 1, is that two identical coils A and B have the same voltage impressed upon them. Since both the coils have been wound so that the M.M.F. of A cancels the M.M.F. of B, the flux in the toroid will be zero. However should the voltage of the same magnitude but varying phase relationship be impressed across each individual coil then the M.M.F.'s of the coils A and B will have a phase shift. Hence an error will be created in the coil C, shown in FIGURE 1, because the flux in the toroid will be alternating.

The only time an error is not present in the coil C is when the reference voltage and the variable voltage are in phase. The actual error in coil C will have the phase relationship depending on the variable and reference voltages.

Mathematically the error can be analysed in the following manner, assuming that the reference voltage is $E \sin wt$ and the variable voltage is $E \sin (wt-\alpha)$, where $\alpha$ is the phase difference between the two. Since the voltage in the coils is dependent on the individual M.M.F.'s the voltage induced will be:

$Ec \sin wt - Ec \sin (wt-\alpha) = $ error signal

Minus the result of opposing M.M.F.'s.

$Ec$ is the same magnitude in both cases because coils A and B are identical.

Therefore, $Ec (\sin wt - \sin (wt-\alpha)) = $ error signal.

In the expansion of trigonometric identity, this becomes, $Ec (\sin wt - \sin wt \cos \alpha + \cos wt \sin \alpha) = $ error signal and because $wt$ is constant to $\alpha$ and can be used as reference zero, then the expression becomes, $Ec (0) - (0) \cos \alpha + (1) \sin \alpha = $ error signal $\sin wt = 0$ $\cos wt = 1$ The final expression is $Ec \sin \alpha = $ error signal.

The significance of the error signal is its dependence on the sine function which is necessary for servo positioning.

The impedance seen by the reference voltage in coil A and the variable voltage in coil B will change with phase shift. Hence reactance will decrease the amount of load current as the phase shift increases. Hence buffer amplifiers with maximum and minimum load current must be developed. However at small errors the sensor will behave as an $Ec \sin \alpha$. The accuracy then can be extremely good. Since you are going to correct for large errors then no problem has been created at large angles of $\alpha$.

Referring to FIGURE 1, which shows a schematic diagram of the positioning servo, there is shown the sensing device 1, the electric motor 2, and the phase shifter 3. A variable phase voltage 4 is shown impressed on the left side of the diagram and a reference phase voltage 5 on the right side of the diagram. Buffer amplifiers 6 and 7 are shown on each side of the sensing device for serving as constant input impedance for reference phase voltages and a constant output voltage across the varying impedance of the coil. These buffer amplifiers may be made of tubes or transistors as desired in the particular design. The rotation of the phase shifter 3 makes the variable phase voltage lag or lead the input of the phase shifter. By rotating the rotor of the phase shifter 3 the output voltage will come in phase with the reference voltage. A null will then be obtained at the error signal coil.

When an error is obtained in the error signal coil C it is amplified and connected to the rotor of an A.-C. motor 2. A power amplifier 8 is shown for amplifying the error signal to the electric motor 2. The electric motor 2 is designed to run at the same frequency as the reference voltage. The power must be limited by the specifications of the motor.

If an error signal is obtained in error signal coil C then power will be created to run the electric motor 2. Since the electric motor 2 will rotate depending on the phase relation between the reference voltage and the variable voltage, then the gear train connected to the phase shifter 3 rotor shaft must be in a manner so as to rotate the shaft towards a null. As soon as a null has registered in the error coil C then the system stops. If the motor 2 overshoots the null, then the motor 2 will be reversed and driven back to null position. If this creates oscillations then the feed back on the power amplifier 8 is to be adjusted until the oscillations are eliminated.

The system is a servo-follower in that the electric motor 2 will rotate the phase until a null is obtained. Any shift in the variable reference signal will be registered on the phase shifter rotor shaft.

The number of mechanical degrees that the phase shifter rotor moves will be the actual number of electrical degrees the variable phase voltage lags or leads the reference voltage. Actually the phase relationship will be a full 360 degrees continuous reading.

Figure 2:
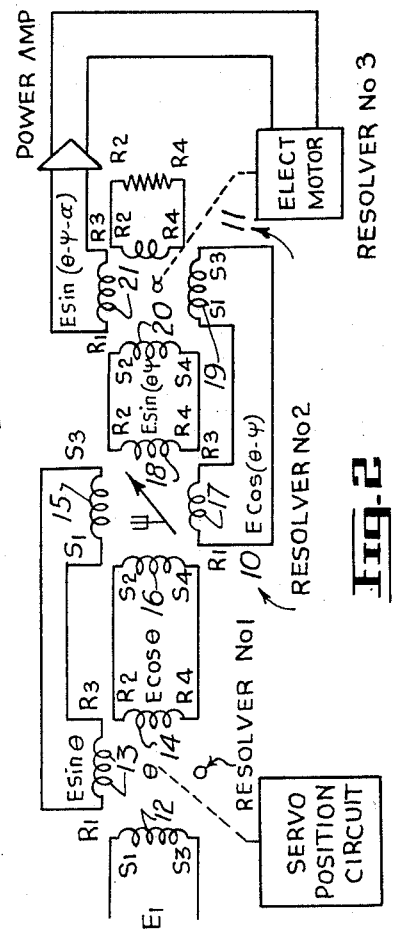
FIGURE 2 is a schematic drawing of a navigational computer.

With reference to FIGURE 2 which shows schematically the navigational computer for which the positioning servo described above is to be used, there are shown three resolvers 9, 10 and 11. The rotor of the resolver 9 is mounted on the shaft of the positioning servo described above. Thus the angle on the rotor of resolver 9 after the resolver has been aligned will be the angle between the reference and variable phase voltage. This angle by definition is the number of degrees from North the aircraft is flying or whatever reference is used. The second resolver 10 is the course the aircraft desires to take, which is a setting by a hand operation by the pilot, co-pilot or remote control. The final resolver 11 is a servo position circuit. The error signal from the rotor $R_1 R_3$ is amplified and used to drive the servo motor connected to that rotor. This is a null-seeking device.

The mathematical analysis can be explained as follows: A resolver takes a constant frequency voltage and breaks it into a sine and cosine function from the rotor position, that is the magnitude of the voltage induced into the rotor coils depend on their relative position with the stator. Since the rotor coils are 90° to each other, at zero rotor position the one rotor coil has maximum voltage induced in it while the other has a zero reading. When the shaft is rotated 90° the coil with no voltage induced previously has maximum voltage while the other coil has none. Both the induced voltages have no phase shift. The individual induced voltages can be only in phase or 180° out of phase. The magnitude of each depends on the rotor position with respect to the stator.

Referring to FIGURE 2 the stator coil 12 of resolver No. 1 referred to in the figure as 9 has a constant voltage applied across terminals $S_1$, $S_3$. The rotor coil 13, $R_1$, $R_3$ of the resolver 9, has a voltage $E \sin \theta$ induced in it while coil 14, $R_2$, $R_4$, has the voltage $E \cos \theta$. $E \sin \theta$ is connected to the resolver No. 2, referred to in the figure as 10, at stator terminals 15, $S_1$, $S_3$, as indicated in the schematic. $E \cos \theta$ is impressed upon the resolver 10 at the stator coils 16, $S_2 S_4$.

The rotor coil 17, $R_1$, $R_3$ of resolver 10 has a voltage $E \cos \theta \cos W + E \sin W \sin \theta$ or by trigonometric identity $E \cos (\theta - W)$ at its terminals. By the same reasoning rotor coils $R_2$, $R_4$, 18, have the voltage output $$E \sin (\theta - W)$$

$E \cos (\theta - W)$ is placed across terminals 19, $S_1$, $S_3$, of the resolver No. 3, referred to in the figure as 11. $E \sin (\theta - W)$ is connected across the stator terminals 20, $S_2 S_4$. The output of the terminals 21, $R_1$, $R_3$, is $E \sin (\theta - W - \alpha)$. The second coil of resolver 11 has an impedance-matching resistor as a load.

The significance of the three resolvers 9, 10, and 11 is that the proper position of the rotors makes it possible to use this system as an automatic computer for guiding aircraft. The positioning servo gives the computor the actual aircraft direction $\theta$, as shown in resolver 9 of the FIGURE 2. The position of the second resolver 10 determines the desired course the aircraft should be flying. This position is set by the pilot. The output from the third resolver rotor 21, $R_1$, $R_3$, is used as an error signal to drive the rotor shaft of the resolver 11 until a null occurs. The mechanical shaft movement from its zero position is the number of degrees the aircraft is off its set course as determined by the pilot. This indicates to the left or to the right.

The advantage of this is that the operation is completely automatic.

The servo may also be used as a phase shift meter. You can find automatically the total number of degrees difference between an input voltage and an output voltage. Lag or lead circuits cannot affect the reading.

Buffer amplifiers must be designed so that the reference and variable signals are amplified and limited. The input impedance of the amplifiers should be in the megohms. The output of the amplifiers should match the particular impedance connected to it. Again this circuit would read automatically.

Figure 3:
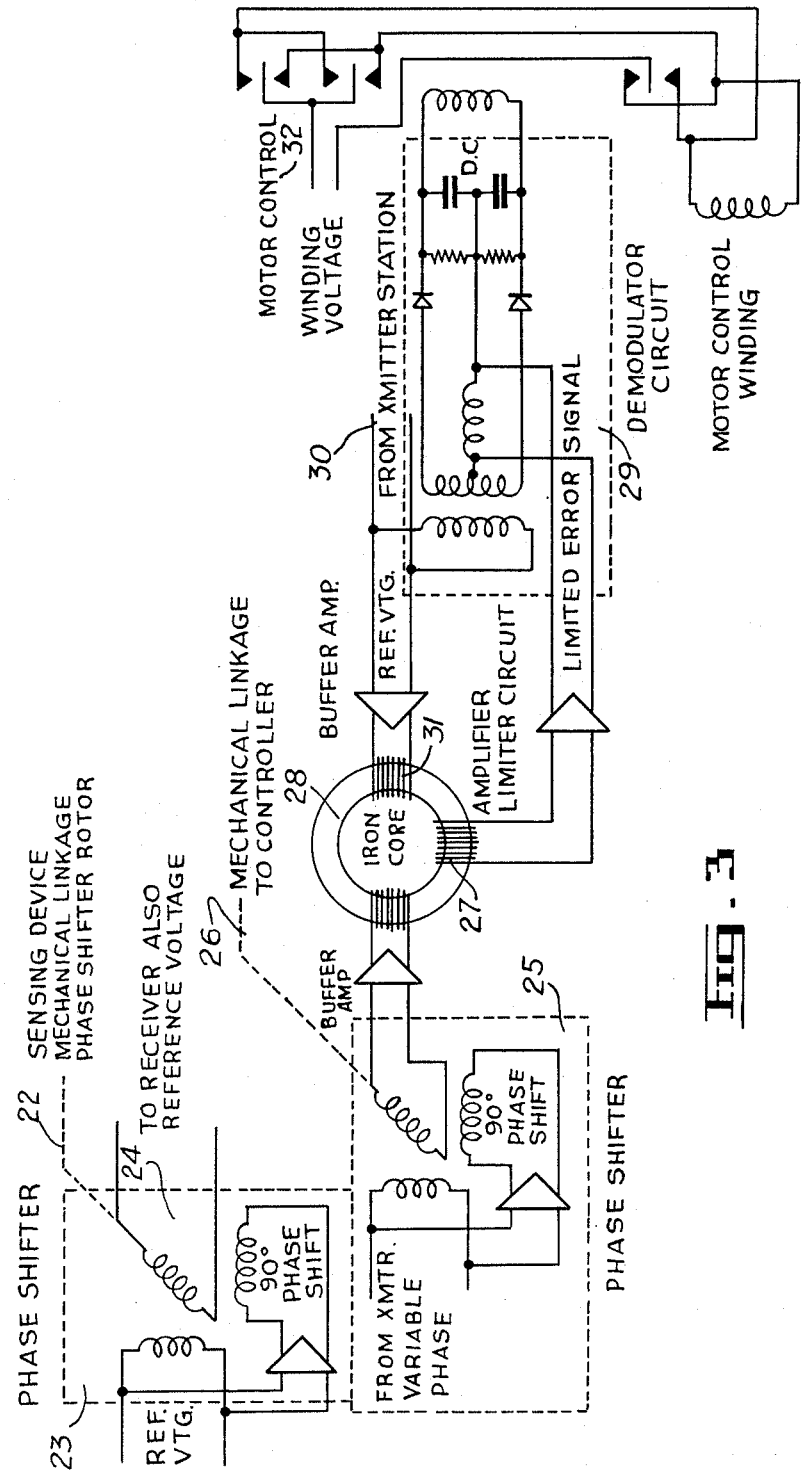
FIGURE 3 is a schematic drawing of a positioning servo system for industrial processes.

The positioning servo could be used as a positioning system for automatic control of positioning servo systems used in refineries and other automatic systems. The schematic drawing shown in FIGURE 3 shows how this would operate. The exact use in this case can be only determined by the industrial process to which it is applied.

The operation of the system set forth in FIGURE 3 is as follows: The parts are described in their schematic block form. The sensing device 22, whatever it may be, is mechanically linked to the phase shifter 23. Any movement in the device will rotate the rotor winding of the phase shifter 23. The variable signal will be carried to the receiver end by wires 24. The reference voltage is also carried to the receiver.

At the receiver the variable phase signal is connected to another phase shifter 25 which is connected by mechanical linkage 26 to the controller. The rotor will rotate in an opposite direction from the transmitter phase shifter 25 until the output of the rotor coil is at the same phase as the original reference signal. As long as the variable phase is out of phase with the reference voltage the error coil 27 of the iron core 28 will be induced. The output of the coil is amplified and limited to a specific voltage. This voltage is connected to the center coil of the demodulation circuit 29. The reference voltage from the transmitter 30 is across the other coil 31 as shown in the schematic drawing FIGURE 3.

When both voltages are in phase then no direct current output is created. Hence the relay remains open. The D.C. current into the relay depends on whether the iron core 28 error signal lags or leads the relay. By connecting the central winding of the controller motor 32 to the relay poles as shown the motor 32 will rotate in either direction depending on the D.C. current in the relay. Hence position is maintained as determined by the sensing device.

The basic theory behind VOR is that an airborne craft with the use of direction antenna is able to determine its direction from a reference and variable signal radiating from a transmitter. The comparison of the phase shift of the two signals gives the direction an aircraft is flying with reference to a given direction, usually North. The difference between the VOR system and the positioning servo described in this application is that the positioning servo takes the reference and variable voltages and compares them.

Figure 4:
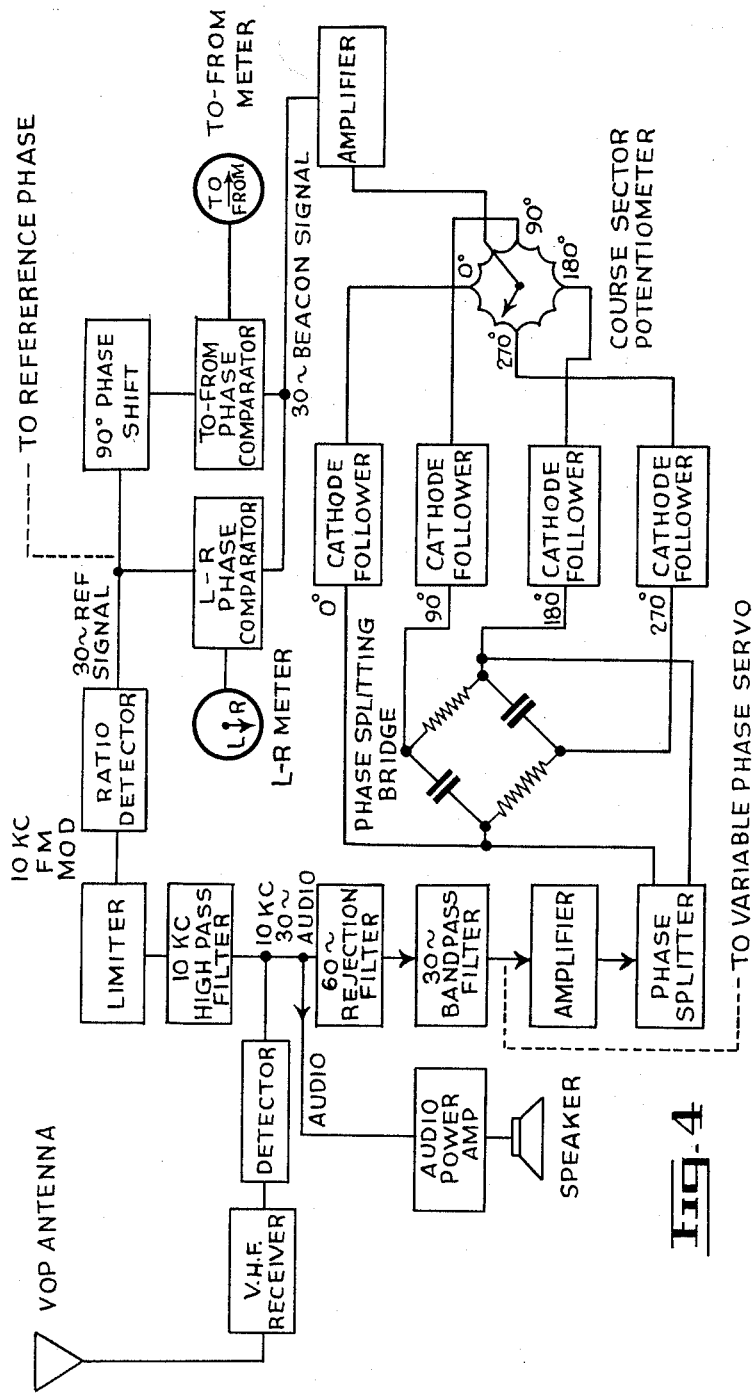
FIGURE 4 is schematic block diagram of a VOR receiver.

Referring to FIGURE 4 there is shown and described schematically the complete block diagram of the VOR receiver. The details of this system are well known and no further description is necessary. The connections to the reference phase voltge and the variable phase voltage servo are shown.

While the invention has been fully described with particular reference to the specific embodiments it is understood it is not to be limited thereto but is to be construed broadly and limited only by the scope of the claims.

The embodiments of the invention in which an exclusive property or privilege is claimed are defined as follows:

1. A positioning servo for a navigational computer comprising an iron core, two identical coils on said core, a reference phase voltage impressed on one of said coils, a variable phase voltage impressed on the other coil, buffer amplifiers for providing input impedances for the said reference and variable phase voltages and a constant out-put voltage across the varying impedance of the coils, a third coil on said core, a power amplifier connected to said third core and a two-phase electric motor connected to said power amplifier, a phase shifter provided with a rotor shaft, and a gear train connecting the phase shifter rotor shaft to the electric motor so as to rotate the rotor towards a null.

2. A positioning servo for a navigational computer as defined in claim 1 in which the said positioning servo is provided with a shaft, a first resolver, a rotor for said first resolver mounted on the said shaft of said positioning servo, means for aligning the first resolver rotor to indicate the angle between the reference and variable voltages, a second resolver, the said second resolver having a rotor adapted to be positioned to indicate the desired course an aircraft should be flying, and a third resolver having a rotor adapted to indicate the number of degrees the aircraft is off course.

3. A positioning servo for a navigation computer as defined in claim 1 in which the said positioning servo is provided with a shaft, first, second and third resolvers, a rotor for said first resolver mounted on the said shaft of said positioning servo, a stator coil for the first resolver having a constant voltage applied across its terminals, two rotor coils for said first resolver having induced voltages, one of said rotor coils of said first resolver connected to a first stator coil of a second resolver and the other of said rotor coils of said first resolver impressed on a second stator coil of said second resolver, a rotor shaft for said second resolver, two rotor coils for said second resolver having induced voltages, one of said rotor coils of said second resolver connected to a first stator coil of a third resolver and the other of said rotor coils of said second resolver having its voltage impressed on a second stator coil of said third resolver, two rotor coils for said third resolver having induced voltages, one of said rotor coils of said third resolver connected to a power amplifier and to an electric motor and having an output to drive the rotor shaft of said third resolver until a null occurs, and the other of said rotor coils of said third resolver connected to an impedance-matching resistor.

References Cited in the file of this patent

UNITED STATES PATENTS

| | | |
|---|---|---|
| 2,760,132 | Pawley | Aug. 21, 1956 |
| 2,791,744 | Carney | May 7, 1957 |
| 2,838,688 | Loewe | June 10, 1958 |
| 2,940,028 | Parazen | June 7, 1960 |

OTHER REFERENCES

Terman, F. E.: Electronic and Radio Engineering, Fourth Edition, pp. 1041, 42; New York, 1955, McGraw-Hill.